(12) United States Patent
Eavy et al.

(10) Patent No.: US 12,047,409 B2
(45) Date of Patent: Jul. 23, 2024

(54) SYSTEM AND METHOD FOR IMPLEMENTING A BEHAVIOR DRIVEN ARCHITECTURE MODULE

(71) Applicant: JPMorgan Chase Bank, N.A., New York, NY (US)

(72) Inventors: Ryan Eavy, Chicago, IL (US); Michael P Fiorini, Chicago, IL (US); Srividya Rajesh, Plano, TX (US); Vikram Seshadri, Richmond, TX (US); Colleen G Byrne, Chicago, IL (US); Olisa Obinna Okpoko, Brighton, MI (US)

(73) Assignee: JPMORGAN CHASE BANK. N.A., New York, NY (US)

( * ) Notice: Subject to any disclaimer, the term of this patent is extended or adjusted under 35 U.S.C. 154(b) by 344 days.

(21) Appl. No.: 17/653,230

(22) Filed: Mar. 2, 2022

(65) Prior Publication Data

US 2022/0286477 A1 Sep. 8, 2022

Related U.S. Application Data

(60) Provisional application No. 63/155,539, filed on Mar. 2, 2021.

(51) Int. Cl.
*H04L 9/40* (2022.01)

(52) U.S. Cl.
CPC ...... *H04L 63/1466* (2013.01); *H04L 63/1433* (2013.01); *H04L 63/20* (2013.01)

(58) Field of Classification Search
CPC .. H04L 63/1466; H04L 63/1433; H04L 63/20
(Continued)

(56) References Cited

U.S. PATENT DOCUMENTS 8,392,877 B1 * 3/2013 Chiluvuri ............ G06F 8/36
717/106
2007/0299802 A1 12/2007 Kwok
(Continued)

OTHER PUBLICATIONS

James et al, Natural-Language Processing Support for Developing Policy-Governed Software Systems, 2002, Proceedings 39th International Conference and Exhibition on Technology of Object-Oriented Languages and Systems p. 263-274 (Year: 2002).*
(Continued)

*Primary Examiner* — Moeen Khan
(74) *Attorney, Agent, or Firm* — GREENBLUM & BERNSTEIN, P.L.C.

(57) ABSTRACT

Various methods, apparatuses/systems, and media for implementing a behavior driven architecture module is disclosed. A processor operatively connected to a database a communication network. The processor accesses the database to obtain patterns information data, data contracts information data, and dependencies information data associated with an application's architecture; implements a natural language processing algorithm to describe behavior of the application's architecture and to build a plurality of contexts data providing characteristics information related to each component of the application's architecture; implements a conversational artificial intelligence algorithm to receive input responses to fill in missing gaps corresponding to the application' architecture; integrates the received input responses with the patterns information data, data contracts information data, and dependencies information data associated with the application's architecture; and generates, in response to integrating, a graph having a unique shape that describes the characteristics information related to each component of the application's architecture.

17 Claims, 7 Drawing Sheets

(58) Field of Classification Search
USPC .......................................................... 726/22
See application file for complete search history.

(56) References Cited

U.S. PATENT DOCUMENTS

| | | |
|---|---|---|
| 2011/0231353 A1 | 9/2011 | Wang et al. |
| 2012/0016678 A1 | 1/2012 | Gruber et al. |
| 2015/0142704 A1* | 5/2015 | London ............. G06F 16/90332 |
| | | 706/11 |
| 2020/0236143 A1* | 7/2020 | Zou ..................... G06F 21/1078 |
| 2021/0263733 A1* | 8/2021 | Tanniru ............... G06F 11/3452 |

OTHER PUBLICATIONS

Official Communication Received in PCT Application No. PCT/US2022/18537, dated Jun. 21, 2022.

* cited by examiner

SYSTEM AND METHOD FOR IMPLEMENTING A BEHAVIOR DRIVEN ARCHITECTURE MODULE

CROSS-REFERENCE TO RELATED APPLICATIONS

This application claims the benefit of priority from U.S. Provisional Patent Application No. 63/155,539, filed Mar. 2, 2021 which is herein incorporated by reference in its entirety.

TECHNICAL FIELD

This disclosure generally relates to data processing, and, more particularly, to methods and apparatuses for implementing a behavior driven architecture module for automatically producing consistent designs and ensuring that the assessment and documentation of a system's architecture is current.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, across the multiple lines of businesses (LOB) at an organization, application developers are constantly faced with a daunting task of developing new applications for improving customer experience as well as productivity. Often, the application developers may be heavily burdened with manual steps and lack of consistency in producing consistent designs and may specifically face challenges in ensuring whether the assessment and documentation of an application's architecture is current. According to conventional process, producing and consuming architectural and design information, such as in the form of diagrams, may be extremely inconsistent, and it may lack the ability to describe the behavior of how a system is supposed to work. In addition, the conventional process often fail to show where the inherent risks are and where the mitigating controls or control requirements should exist in the architecture. Thus, the conventional process of evaluating an architecture or design is not only a manual exercise but it is fraught with human error and inconsistency.

SUMMARY

The present disclosure, through one or more of its various aspects, embodiments, and/or specific features or sub-components, provides, among other features, various systems, servers, devices, methods, media, programs, and platforms for implementing a behavior driven architecture module for automatically producing consistent designs and ensuring that the assessment and documentation of a system's architecture is current, but the disclosure is not limited thereto. For example, the present disclosure, through one or more of its various aspects, embodiments, and/or specific features or sub-components, also provides, among other features, various systems, servers, devices, methods, media, programs, and platforms for implementing a behavior driven architecture module that automatically produces and consumes architectural and design information of a system in a consistent manner, describes the behavior of how the system should work, identifies where the inherent risks (e.g., cybersecurity risks, operational risks, etc., but the disclosure is not limited thereto) are in the architecture, and identifies where the mitigating controls or control requirements should exist in the architecture, but the disclosure is not limited thereto.

According to an aspect of the present disclosure, a method for implementing a behavior driven architecture module is disclosed. The method may include: accessing a database to obtain patterns information data, data contracts information data, and dependencies information data associated with an application's architecture; implementing a natural language processing algorithm to describe behavior of the application's architecture and to build a plurality of contexts data providing characteristics information related to each component of the application's architecture; implementing a conversational artificial intelligence algorithm to receive input responses to fill in missing gaps corresponding to the application' architecture; integrating the received input responses with the patterns information data, data contracts information data, and dependencies information data associated with the application's architecture; and generating, in response to integrating, a graph having a unique shape that describes the characteristics information related to each component of the application's architecture.

According to another aspect of the present disclosure, the method may further include: certifying the graph having the unique shape; and implementing the graph in a process for identifying that a particular component having a certain characteristic meets a certain control or other compliance certification for deploying into an application development environment, or an application testing environment, or an application production environment.

According to yet another aspect of the present disclosure, wherein the control may include one or more of the following: regulatory control, cybersecurity control, and general policy within an organization, but the disclosure is not limited thereto.

According to a further aspect of the present disclosure, the method may further include: generating the graph in manner such that the graph describes the behavior of how the application should work, identifies a location in the architecture where the architecture is subjected to a risk, and identifies a location in the architecture where mitigating controls or control requirements should exist in the architecture.

According to an additional aspect of the present disclosure, wherein the risk may include one or more of the following: cybersecurity risk, operational risk, public or internet attack risk, and internet originated cybersecurity attack risk, but the disclosure is not limited thereto.

According to yet another aspect of the present disclosure, the method may further include: representing a particular component in the application's architecture based the unique shape of the graph and relationships between nodes in the graph.

According to an additional aspect of the present disclosure, the method may further include: automatically updating the graph and relationships between nodes in the graph in real time based on receiving real time additional data or change data corresponding to development of the application, and/or testing of the application, and/or production of the application that is output from a developer computing device.

According to a further aspect of the present disclosure, the method may further include: accessing the database to obtain patterns information data, data contracts information data, and dependencies information data associated with a plurality of applications each having a unique shape that is different from a shape of another application among said plurality of applications; and implementing a natural language processing algorithm to describe behavior of a corresponding architecture associated with each application; implementing a conversational artificial intelligence algorithm to receive input responses to fill in missing gaps associated with the corresponding architecture; integrating the received input responses with the patterns information data, data contracts information data, and dependencies information data; and generating a graph for each application such that a graph for one application is unique in shape than a graph for another application among said plurality of applications.

According to an aspect of the present disclosure, a system for implementing a behavior driven architecture module is disclosed. The system may include one or more databases that may include memories for storing patterns information data, data contracts information data, and dependencies information data associated with an application's architecture. The system may also include a processor operatively coupled to the one or more databases including the memories via a communication network. The processor may be configured to: access a database to obtain patterns information data, data contracts information data, and dependencies information data associated with an application's architecture; implement a natural language processing algorithm to describe behavior of the application's architecture and to build a plurality of contexts data providing characteristics information related to each component of the application's architecture; implement a conversational artificial intelligence algorithm to receive input responses to fill in missing gaps corresponding to the application' architecture; integrate the received input responses with the patterns information data, data contracts information data, and dependencies information data associated with the application's architecture; and generate, in response to integrating, a graph having a unique shape that describes the characteristics information related to each component of the application's architecture.

According to another aspect of the present disclosure, the processor may be further configured to: certify the graph having the unique shape; and implement the graph in a process for identifying that a particular component having a certain characteristic meets a certain control or other compliance certification for deploying into an application development environment, or an application testing environment, or an application production environment.

According to a further aspect of the present disclosure, the processor may be further configured to: generate the graph in manner such that the graph describes the behavior of how the application should work, identifies a location in the architecture where the architecture is subjected to a risk, and identifies a location in the architecture where mitigating controls or control requirements should exist in the architecture.

According to yet another aspect of the present disclosure, the processor may be further configured to: represent a particular component in the application's architecture based the unique shape of the graph and relationships between nodes in the graph.

According to an additional aspect of the present disclosure, the processor may be further configured to: automatically update the graph and relationships between nodes in the graph in real time based on receiving real time additional data or change data corresponding to development of the application, and/or testing of the application, and/or production of the application that is output from a developer computing device.

According to a further aspect of the present disclosure, the processor may be further configured to: access the database to obtain patterns information data, data contracts information data, and dependencies information data associated with a plurality of applications each having a unique shape that is different from a shape of another application among said plurality of applications; and implement a natural language processing algorithm to describe behavior of a corresponding architecture associated with each application; implement a conversational artificial intelligence algorithm to receive input responses to fill in missing gaps associated with the corresponding architecture; integrate the received input responses with the patterns information data, data contracts information data, and dependencies information data; and generate a graph for each application such that a graph for one application is unique in shape than a graph for another application among said plurality of applications.

According to an aspect of the present disclosure, a non-transitory computer readable medium configured to store instructions for implementing a behavior driven architecture module is disclosed. The instructions, when executed, may cause a processor to perform the following: accessing a database to obtain patterns information data, data contracts information data, and dependencies information data associated with an application's architecture; implementing a natural language processing algorithm to describe behavior of the application's architecture and to build a plurality of contexts data providing characteristics information related to each component of the application's architecture; implementing a conversational artificial intelligence algorithm to receive input responses to fill in missing gaps corresponding to the application' architecture; integrating the received input responses with the patterns information data, data contracts information data, and dependencies information data associated with the application's architecture; and generating, in response to integrating, a graph having a unique shape that describes the characteristics information related to each component of the application's architecture.

According to another aspect of the present disclosure, the instructions, when executed, may cause the processor to perform the following: certifying the graph having the unique shape; and implementing the graph in a process for identifying that a particular component having a certain characteristic meets a certain control or other compliance certification for deploying into an application development environment, or an application testing environment, or an application production environment.

According to a further aspect of the present disclosure, the instructions, when executed, may cause the processor to perform the following: generating the graph in manner such that the graph describes the behavior of how the application should work, identifies a location in the architecture where the architecture is subjected to a risk, and identifies a location in the architecture where mitigating controls or control requirements should exist in the architecture.

According to yet another aspect of the present disclosure, the instructions, when executed, may cause the processor to perform the following: representing a particular component in the application's architecture based the unique shape of the graph and relationships between nodes in the graph.

According to an additional aspect of the present disclosure, the instructions, when executed, may cause the processor to perform the following: automatically updating the graph and relationships between nodes in the graph in real time based on receiving real time additional data or change data corresponding to development of the application, and/or testing of the application, and/or production of the application that is output from a developer computing device.

According to a further aspect of the present disclosure, the instructions, when executed, may cause the processor to perform the following: accessing the database to obtain patterns information data, data contracts information data, and dependencies information data associated with a plurality of applications each having a unique shape that is different from a shape of another application among said plurality of applications; and implementing a natural language processing algorithm to describe behavior of a corresponding architecture associated with each application; implementing a conversational artificial intelligence algorithm to receive input responses to fill in missing gaps associated with the corresponding architecture; integrating the received input responses with the patterns information data, data contracts information data, and dependencies information data; and generating a graph for each application such that a graph for one application is unique in shape than a graph for another application among said plurality of applications.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
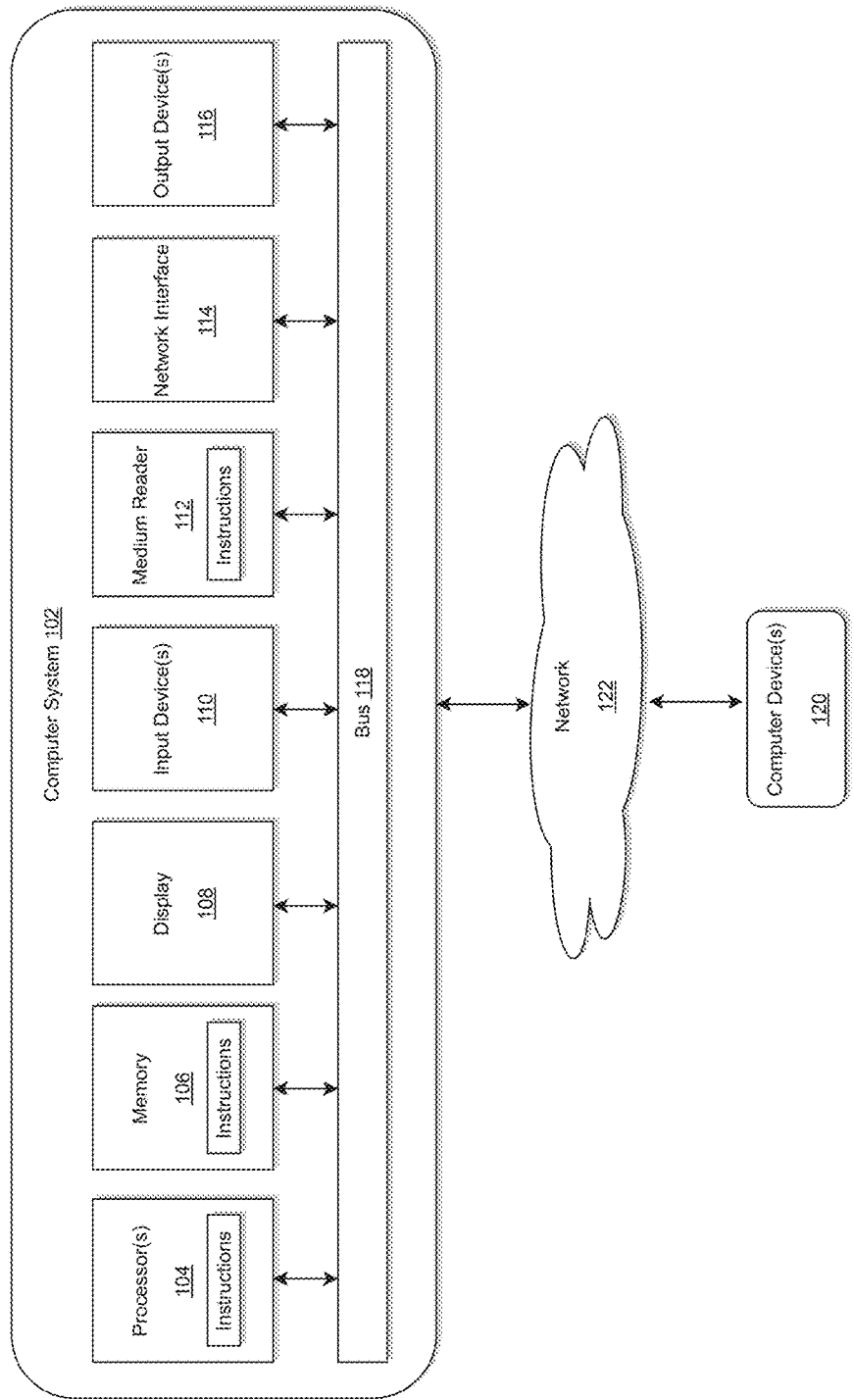
FIG. 1 illustrates a computer system for implementing a behavior driven architecture module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a behavior driven architecture module for automatically generating a behavioral map of an application's architecture in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a behavior driven architecture module for automatically producing consistent designs and ensuring that the assessment and documentation of a system's architecture is current, but the disclosure is not limited thereto. For example, various embodiments may also provide optimized processes of implementing a behavior driven architecture module that automatically produces and consumes architectural and design information of a system in a consistent manner, describes the behavior of how the system should work, identifies where the inherent risks (e.g., cybersecurity risks, operational risks, etc., but the disclosure is not limited thereto) are in the architecture, and identifies where the mitigating controls or control requirements should exist in the architecture, but the disclosure is not limited thereto.

Figure 2:
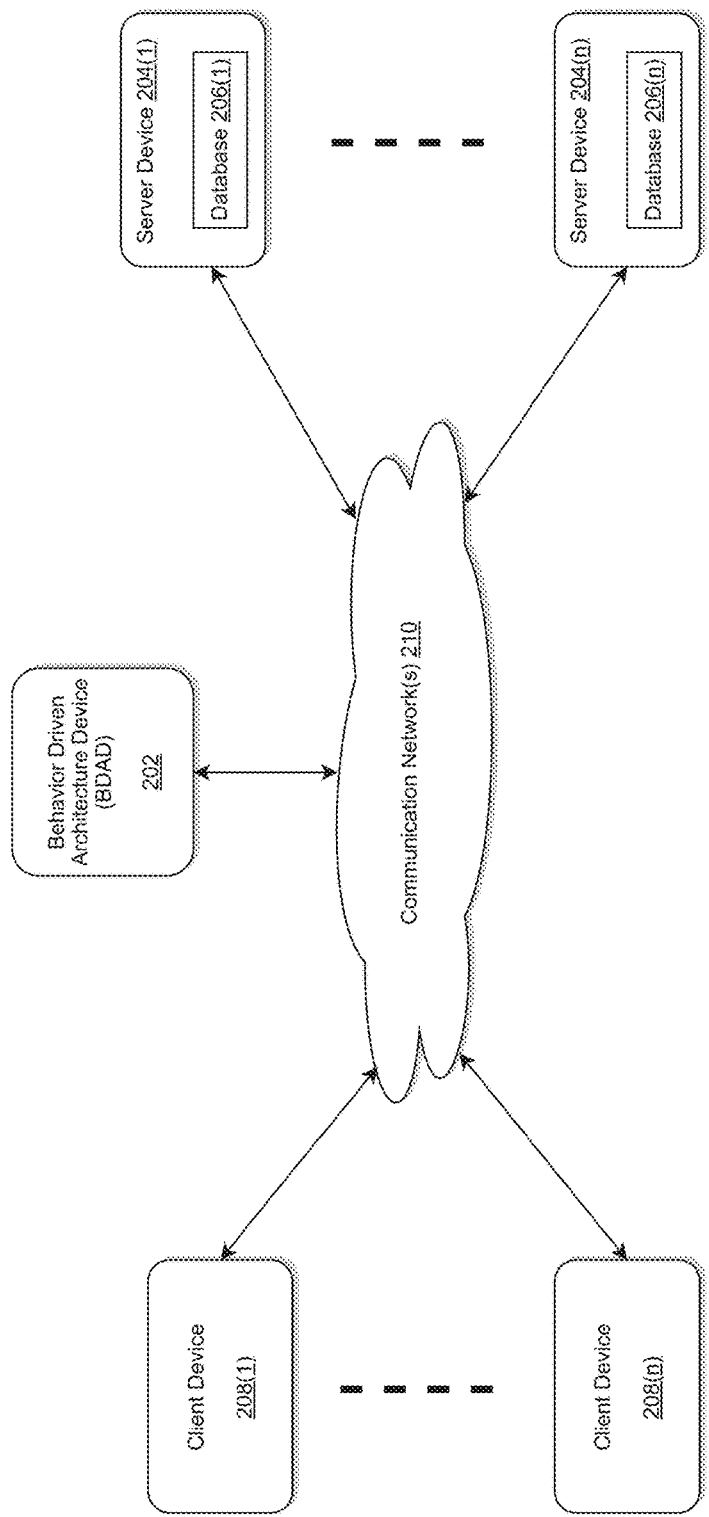
FIG. 2 illustrates an exemplary diagram of a network environment with a behavior driven architecture device in accordance with an exemplary embodiment.

Referring to FIG. 2, a schematic of an exemplary network environment 200 for implementing a behavior driven architecture device (BDAD) of the instant disclosure is illustrated.

According to exemplary embodiments, the above-described problems associated with conventional methods and systems may be overcome by implementing a BDAD 202 as illustrated in FIG. 2 by implementing a behavior driven architecture module for automatically producing consistent designs and ensuring that the assessment and documentation of a system's architecture is current, but the disclosure is not limited thereto. For example, the above-described problems associated with conventional methods and systems may be overcome by implementing a BDAD 202 as illustrated in FIG. 2 by implementing a behavior driven architecture module that automatically produces and consumes architectural and design information of a system in a consistent manner, describes the behavior of how the system should work, identifies where the inherent risks (e.g., cybersecurity risks, operational risks, etc., but the disclosure is not limited thereto) are in the architecture, and identifies where the mitigating controls or control requirements should exist in the architecture, but the disclosure is not limited thereto.

The BDAD 202 may be the same or similar to the computer system 102 as described with respect to FIG. 1.

The BDAD 202 may store one or more applications that can include executable instructions that, when executed by the BDAD 202, cause the BDAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BDAD 202 itself, may be located in virtual server(s) running in a cloud-based computing environment rather than being tied to one or more specific physical network computing devices. Also, the application(s) may be running in one or more virtual machines (VMs) executing on the BDAD 202. Additionally, in one or more embodiments of this technology, virtual machine(s) running on the BDAD 202 may be managed or supervised by a hypervisor.

In the network environment 200 of FIG. 2, the BDAD 202 is coupled to a plurality of server devices 204(1)-204(n) that hosts a plurality of databases 206(1)-206(n), and also to a plurality of client devices 208(1)-208(n) via communication network(s) 210. A communication interface of the BDAD 202, such as the network interface 114 of the computer system 102 of FIG. 1, operatively couples and communicates between the BDAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BDAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BDAD 202 may be a standalone device or integrated with one or more other devices or apparatuses, such as one or more of the server devices 204(1)-204(n), for example. In one particular example, the BDAD 202 may be hosted by one of the server devices 204(1)-204(n), and other arrangements are also possible. Moreover, one or more of the devices of the BDAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BDAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the BDAD 202 that may be configured for implementing a behavior driven architecture module for automatically producing consistent designs and ensuring that the assessment and documentation of a system's architecture is current, but the disclosure is not limited thereto. For example, the client devices 208(1)-208(n) in this example may include any type of computing device that can facilitate the implementation of the BDAD 202 that may be configured for implementing a behavior driven architecture module that automatically produces and consumes architectural and design information of a system in a consistent manner, describes the behavior of how the system should work, identifies where the inherent risks (e.g., cybersecurity risks, operational risks, etc., but the disclosure is not limited thereto) are in the architecture, and identifies where the mitigating controls or control requirements should exist in the architecture, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the BDAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the BDAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BDAD 202, the server devices 204(1)-204(n), or the client devices 208(1)-208(n), for example, may be configured to operate as virtual instances on the same physical machine. For example, one or more of the BDAD 202, the server devices 204(1)-204(n), or the client devices 208(1)-208(n) may operate on the same physical device rather than as separate devices communicating through communication network(s) 210. Additionally, there may be more or fewer BDADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
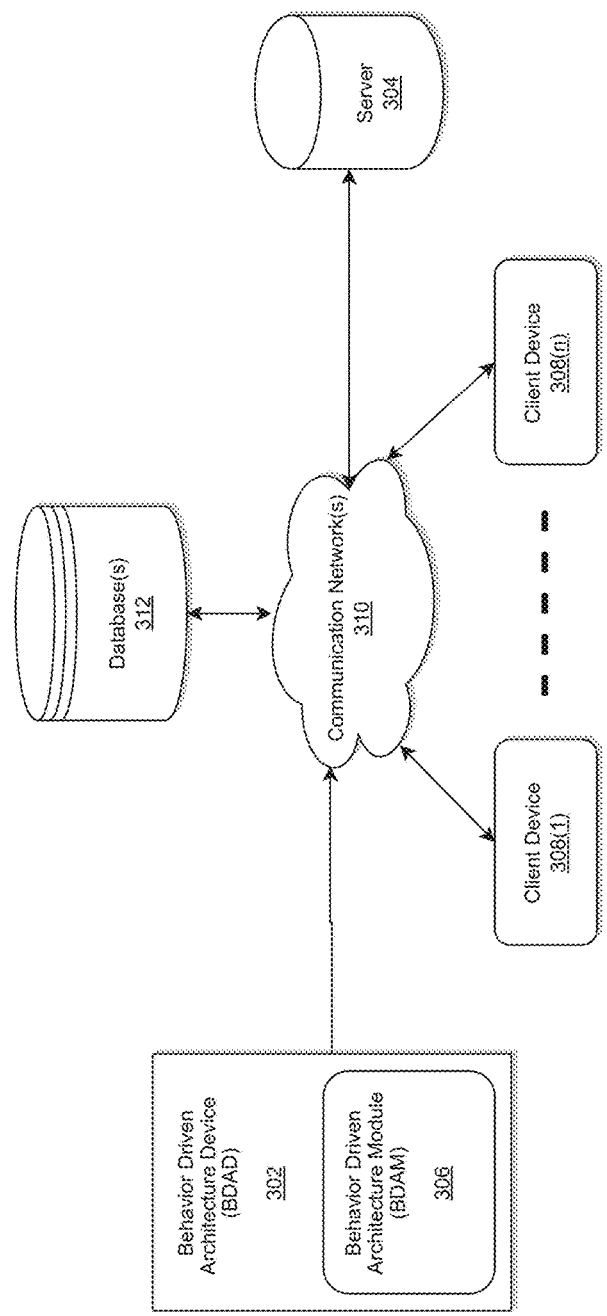
FIG. 3 illustrates a system diagram for implementing a behavior driven architecture device with a behavior driven architecture module in accordance with an exemplary embodiment.

FIG. 3 illustrates a system diagram 300 for implementing a BDAD with a behavior driven architecture module (BDAM) in accordance with an exemplary embodiment.

As illustrated in FIG. 3, the BDAD 302 including the BDAM 306 may be connected to a server 304, and a database 312 via a communication network 310. The BDAD 302 may also be connected to a plurality of client devices 308(1)-308(n) via the communication network 310, but the disclosure is not limited thereto. According to exemplary embodiments, the BDAM 306 may be implemented within the client devices 308(1)-308(n), but the disclosure is not limited thereto. According to exemplary embodiments, the client devices 308(1)-308(n) may be utilized for implementing the BDAM 306 for automatically producing consistent designs and ensuring that the assessment and documentation of a system's architecture is current, but the disclosure is not limited thereto. For example, the client devices 308(1)-308(n) may be utilized for implementing the BDAM 306 for automatically producing and consuming architectural and design information of a system in a consistent manner, describing the behavior of how the system should work, identifying where the inherent risks (e.g., cybersecurity risks, operational risks, etc., but the disclosure is not limited thereto) are in the architecture, and identifying where the mitigating controls or control requirements should exist in the architecture, but the disclosure is not limited thereto.

According to exemplary embodiment, the BDAD 302 is described and shown in FIG. 3 as including the BDAM 306, although it may include other rules, policies, modules, databases, or applications, for example. According to exemplary embodiments, the database 312 may be embedded within the BDAD 302. Although only one database 312 is illustrated in FIG. 3, according to exemplary embodiments, a plurality of databases 312 may be provided. The database 312 may include one or more memories configured to store patterns information data, data contracts information data, and dependencies information data, etc., associated with an application's architecture but the disclosure is not limited thereto. For example, the database 312 may include one or more memories configured to store information including: rules, programs, production requirements, testing requirements, control requirements, regulatory requirements, operational requirements, general other policies within an organization, etc., but the disclosure is not limited thereto. According to exemplary embodiments, the BDAM 306 may be configured to be storage platform agnostic—configured to be deployed across multiple storage layers.

According to exemplary embodiments, the BDAM 306 may be configured to receive continuous feed of data from the database 312 and the server 304 via the communication network 310.

According to exemplary embodiments, the database 412 may also be a private cloud-based database that supports user authentication, database security, and integration with existing databases and developments as well as stores open API specification definition file (i.e., in JSON format) corresponding to an application, but the disclosure is not limited thereto.

According to exemplary embodiments, the BDAM 406 may be implemented via user interfaces, e.g., web user interface, a build automation tool used primarily for Java projects, private Jenkins, etc., but the disclosure is not limited thereto, and may be integrated with a private cloud platform and a distributed file system platform via the BDAM 406 and an authentication service, but the disclosure is not limited thereto.

As will be described below, the BDAM 306 may be configured to access a database to obtain patterns information data, data contracts information data, and dependencies information data associated with an application's architecture; implement a natural language processing algorithm to describe behavior of the application's architecture and to build a plurality of contexts data providing characteristics information related to each component of the application's architecture; implement a conversational artificial intelligence algorithm to receive input responses to fill in missing gaps corresponding to the application' architecture; integrate the received input responses with the patterns information data, data contracts information data, and dependencies information data associated with the application's architecture; and generate, in response to integrating, a graph having a unique shape that describes the characteristics information related to each component of the application's architecture, but the disclosure is not limited thereto.

The plurality of client devices 308(1)-308(n) are illustrated as being in communication with the BDAD 302. In this regard, the plurality of client devices 308(1)-308(n) may be "clients" of the BDAD 302 and are described herein as such. Nevertheless, it is to be known and understood that the plurality of client devices 308(1)-308(n) need not necessarily be "clients" of the BDAD 302, or any entity described in association therewith herein. Any additional or alternative relationship may exist between either or more of the plurality of client devices 308(1)-308(n) and the BDAD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the BDAD 302 via broadband or cellular communication. Of course, these embodiments are merely exemplary and are not limiting or exhaustive.

Figure 4:
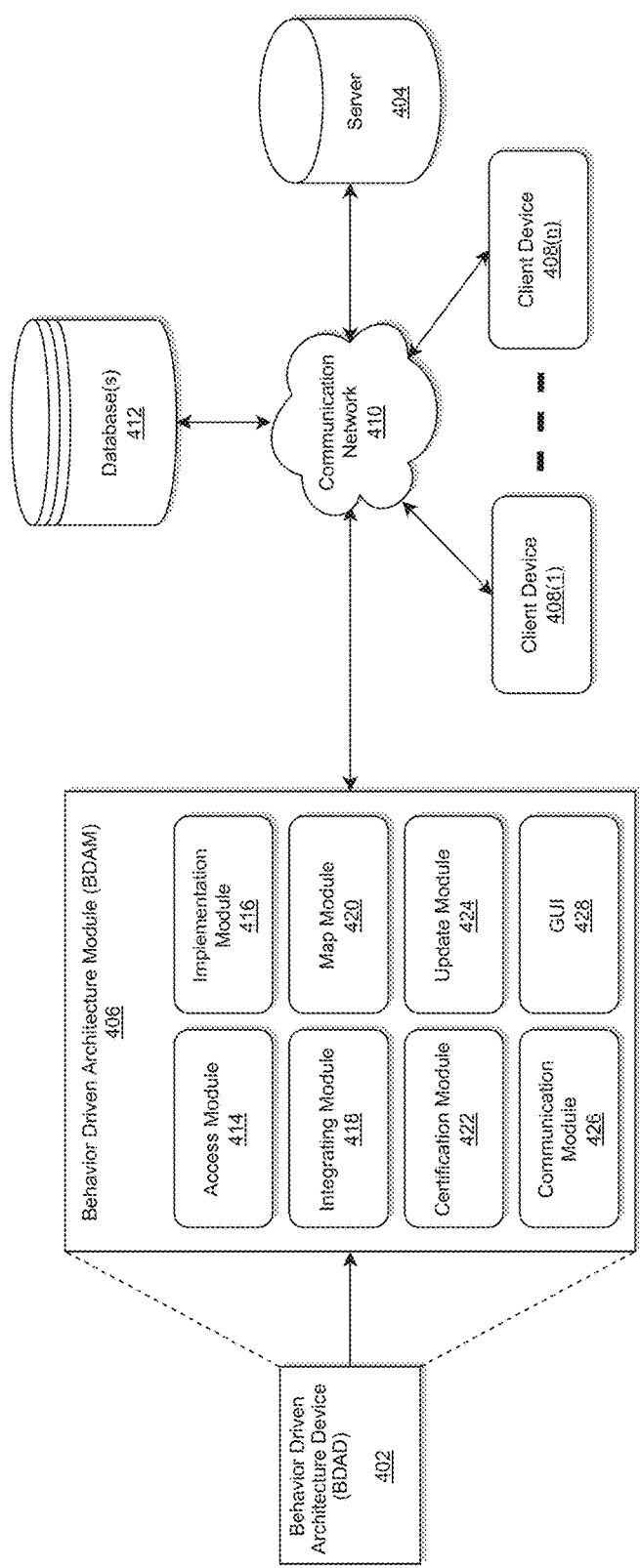
FIG. 4 illustrates a system diagram for implementing a behavior driven architecture module of FIG. 3 in accordance with an exemplary embodiment.

FIG. 4 illustrates a system diagram for implementing a BDAM of FIG. 3 in accordance with an exemplary embodiment.

As illustrated in FIG. 4, the system 400 may include a BDAD 402 within which a BDAM 406 may be embedded, a database 412, a server 404, client devices 408(1)-408(n), and a communication network 410. According to exemplary embodiments, the BDAD 402, BDAM 406, database 412, the server 404, the client devices 408(1)-408(n), and the communication network 410 as illustrated in FIG. 4 may be the same or similar to the BDAD 302, the BDAM 306, the database 312, the server 304, the client devices 308(1)-308(n), and the communication network 310, respectively, as illustrated in FIG. 3.

As illustrated in FIG. 4, the BDAM 406 may include an access module 414, an implementation module 416, an integrating module 418, a map module 420, a certification module 422, an update module 424, a communication module 426, and a graphical user interface (GUI) 428. According to exemplary embodiments, the database 412 may be external to the BDAD 402 may include various systems that are managed and operated by an organization. Alternatively, according to exemplary embodiments, the database 412 may be embedded within the BDAD 402 and/or the BDAM 406.

The process may be executed via the communication module 432 and the communication network 410, which may comprise plural networks as described above. For example, in an exemplary embodiment, the various components of the BDAM 406 may communicate with the server 404, and the database 412 via the communication module 432 and the communication network 410. Of course, these embodiments are merely exemplary and are not limiting or exhaustive.

According to exemplary embodiments, the communication network 410 and the communication module 432 may be configured to establish a link between the database 412, the client devices 408(1)-408(n) and the BDAM 406.

According to exemplary embodiments, each of the access module 414, implementation module 416, integrating module 418, map module 420, certification module 422, update module 424, and the communication module 426 may be implemented by microprocessors or similar, they may be programmed using software (e.g., microcode) to perform various functions discussed herein and may optionally be driven by firmware and/or software. Alternatively, each of the access module 414, implementation module 416, integrating module 418, map module 420, certification module 422, update module 424, and the communication module 426 may be implemented by dedicated hardware, or as a combination of dedicated hardware to perform some functions and a processor (e.g., one or more programmed microprocessors and associated circuitry) to perform other functions. Also, according to exemplary embodiments, each of the access module 414, implementation module 416, integrating module 418, map module 420, certification module 422, update module 424, and the communication module 426 may be physically separated into two or more interacting and discrete blocks, units, devices, and/or modules without departing from the scope of the inventive concepts.

According to exemplary embodiments, each of the access module 414, implementation module 416, integrating module 418, map module 420, certification module 422, update module 424, and the communication module 426 of the BDAM 406 may be called by corresponding API, but the disclosure is not limited thereto.

Figure 5:
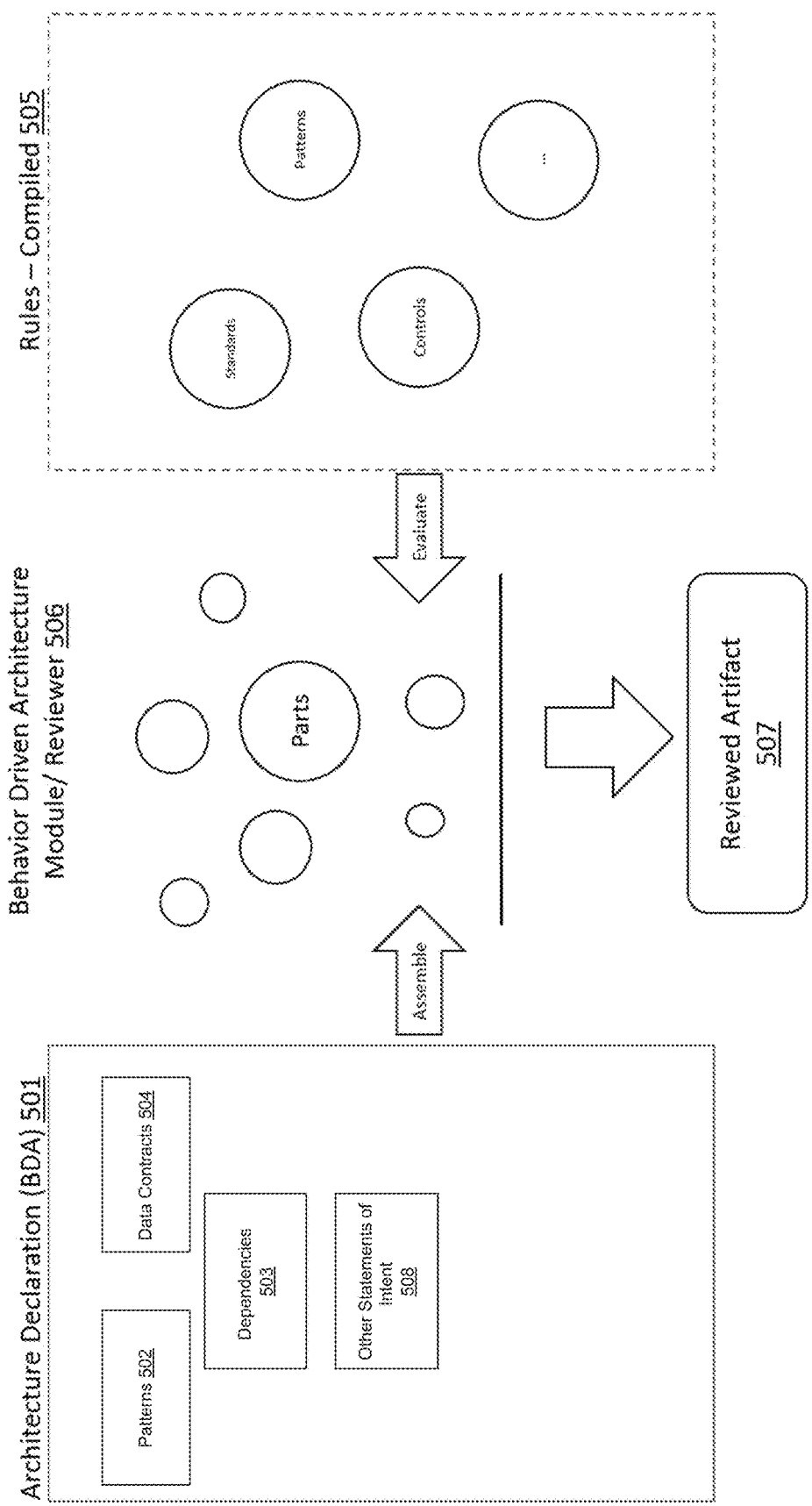
FIG. 5 illustrate an exemplary use case of a behavior driven architecture module in accordance with an exemplary embodiment.

FIG. 5 illustrate an exemplary use case of the BDAM 406 of FIG. 4 in accordance with an exemplary embodiment.

For example, FIG. 5 illustrates a use case diagram 500 that includes an architecture declaration block 501 a behavior driven architecture module/reviewer block (BDAM) 506 and a rules-complied block 505.

According to exemplary embodiments, the architecture declaration block 501 may include a patterns block 502, a data contracts block 504, dependencies block 503, and other statements of intent block 508, but the disclosure is not limited thereto. The architecture declaration block 501 may utilize natural language to describe the architecture of an application based on obtaining data from the patterns block 502, data contracts block 504, dependencies block 503, and the other statements of intent block 508.

For example, the architecture declaration block 501 may utilize natural language to describe what the application's architecture is based on obtaining data from the patterns block 502. The architecture declaration block 501 may utilize natural language to describe what the application's architecture has based on obtaining data from the data contracts block 502. The architecture declaration block 501 may utilize natural language to describe on what the application's architecture depends on based on obtaining data from the dependencies block 503. According to exemplary embodiments, the BDAM 506 may be configured to define controls (see, e.g., the rules-complied block 505) as disclosed herein in the same fashion.

According to exemplary embodiments, the BDAM 506 may be configured to utilize the rules-complied block 505 to compile rules. The BDAM 506 may be configured to assemble parts (elements) received from the patterns block 502, data contracts block 504, dependencies block 503, and the other statements of intent block 508. The BDAM 506 then evaluates the controls against those parts to output a reviewed artifact 507 (i.e., a graph having a unique shape, see FIG. 6).

Figure 6:
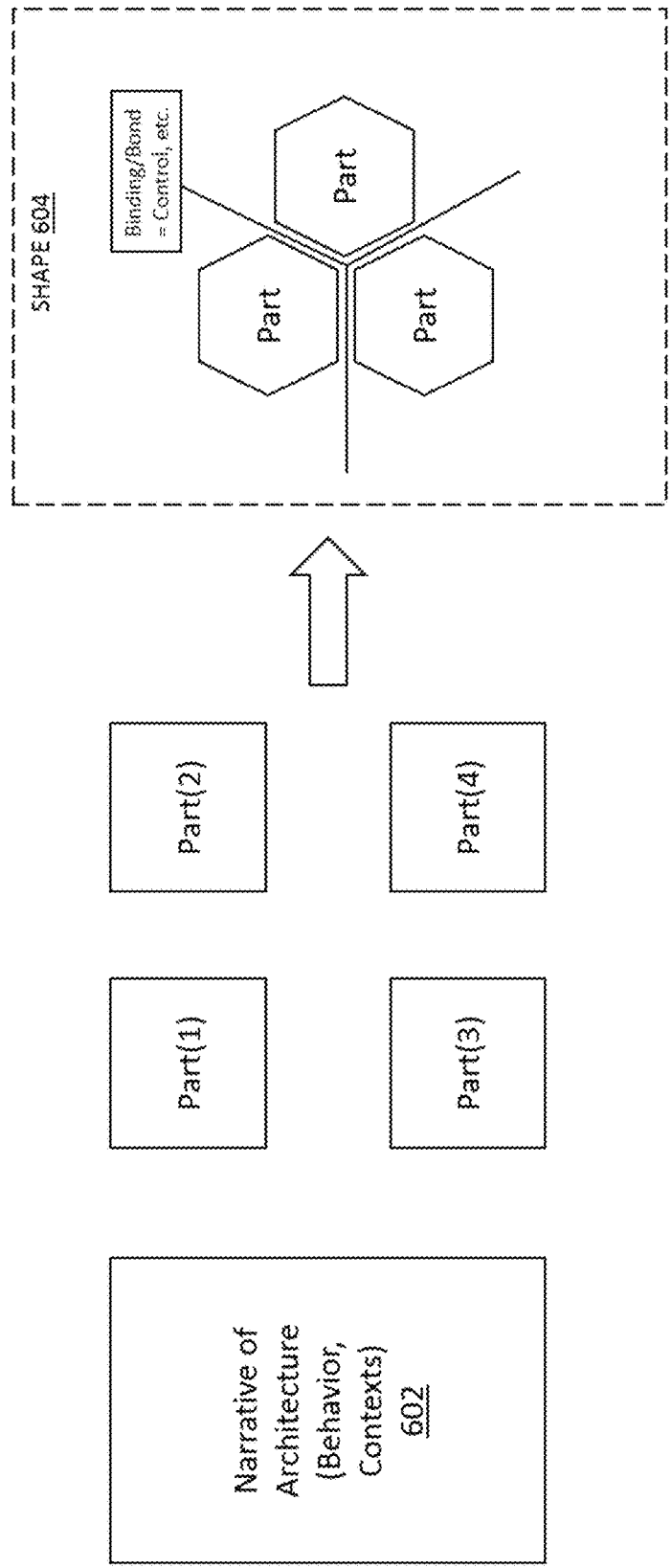
FIG. 6 illustrate another exemplary use case of a behavior driven architecture module in accordance with an exemplary embodiment.

FIG. 6 illustrate an exemplary use case diagram 600 of the BDAM 406, 506 in accordance with an exemplary embodiment which illustrates how parts are generated from narrative of the application's architecture 602 (behavior, contexts, etc.) and a graph having a unique shape 604 is generated by the BDAM 406, 506.

Referring to FIGS. 4, 5, and 6, more detailed processes for the BDAM 406, 506 will be described below in accordance with exemplary embodiments.

For example, according to exemplary embodiments, the access module 414 may be configured to access the database 412 to obtain patterns information data (i.e., from patterns block 502), data contracts information data (i.e., from data contracts block 504), and dependencies information data (i.e., from dependencies block 503) associated with an application's architecture.

According to exemplary embodiments, the implementing module 416 may be configured to implement a natural language processing algorithm to describe behavior of the application's architecture by utilizing the architecture declaration block 501 and to build a plurality of contexts data (i.e., narrative of architecture 602) providing characteristics information related to each component of the application's architecture.

According to exemplary embodiments, the implementing module 416 may be further configured to implement a conversational artificial intelligence algorithm to receive input responses (i.e., other statements of intent 508) to fill in missing gaps corresponding to the application' architecture.

According to exemplary embodiments, the integrating module 418 may be configured to integrate the received input responses with the patterns information data, data contracts information data, and dependencies information data associated with the application's architecture;

According to exemplary embodiments, the map module 420 may be configured to generate, in response to integrating, a graph having a unique shape 604 that describes the characteristics information related to each component of the application's architecture. The GUI 428 may display the graph.

According to exemplary embodiments, the certification module 422 may be configured to certify the graph having the unique shape 604. The implementing module 416 may be further configured to implement the graph having the unique shape 604 in a process for identifying that a particular component having a certain characteristic meets a certain control or other compliance certification for deploying into an application development environment, or an application testing environment, or an application production environment.

According to exemplary embodiments, the control may include one or more of the following: regulatory control, cybersecurity control, and general policy within an organization, but the disclosure is not limited thereto.

According to exemplary embodiments, the map module 420 may generate the graph in manner such that the graph describes the behavior of how the application should work, identifies a location in the architecture where the architecture is subjected to a risk, and identifies a location in the architecture where mitigating controls or control requirements should exist in the architecture.

According to exemplary embodiments, the risk may include one or more of the following: cybersecurity risk, operational risk, public or internet attack risk, and internet originated cybersecurity attack risk, but the disclosure is not limited thereto.

According to exemplary embodiments, the BDAM 406, 506 may represent a particular component in the application's architecture based the unique shape of the graph and relationships between nodes in the graph.

According to exemplary embodiments, the update module 424 may be configured to automatically update the graph and relationships between nodes in the graph in real time based on receiving real time additional data or change data corresponding to development of the application, and/or testing of the application, and/or production of the application that is output from a developer computing device (i.e., computing device 408(1)-408(n)).

According to exemplary embodiments, the access module 414 may be further configured to access the database 412 to obtain patterns information data (i.e., from patterns block 502), data contracts information data (i.e., from data contracts block 504), and dependencies information data (i.e., from dependencies block 503) associated with a plurality of applications each having a unique shape that is different from a shape of another application among said plurality of applications. The implementing module 416 may be configured to implement a natural language processing algorithm to describe behavior of a corresponding architecture associated with each application by utilizing the architecture declaration block 501. The implementing module 416 may also implement a conversational artificial intelligence algorithm to receive input responses to fill in missing gaps associated with the corresponding architecture. The integrating module 418 may integrate the received input responses with the patterns information data, data contracts information data, and dependencies information data. The map module 420 may generate a graph for each application such that a graph for one application is unique in shape than a graph for another application among said plurality of applications.

Figure 7:
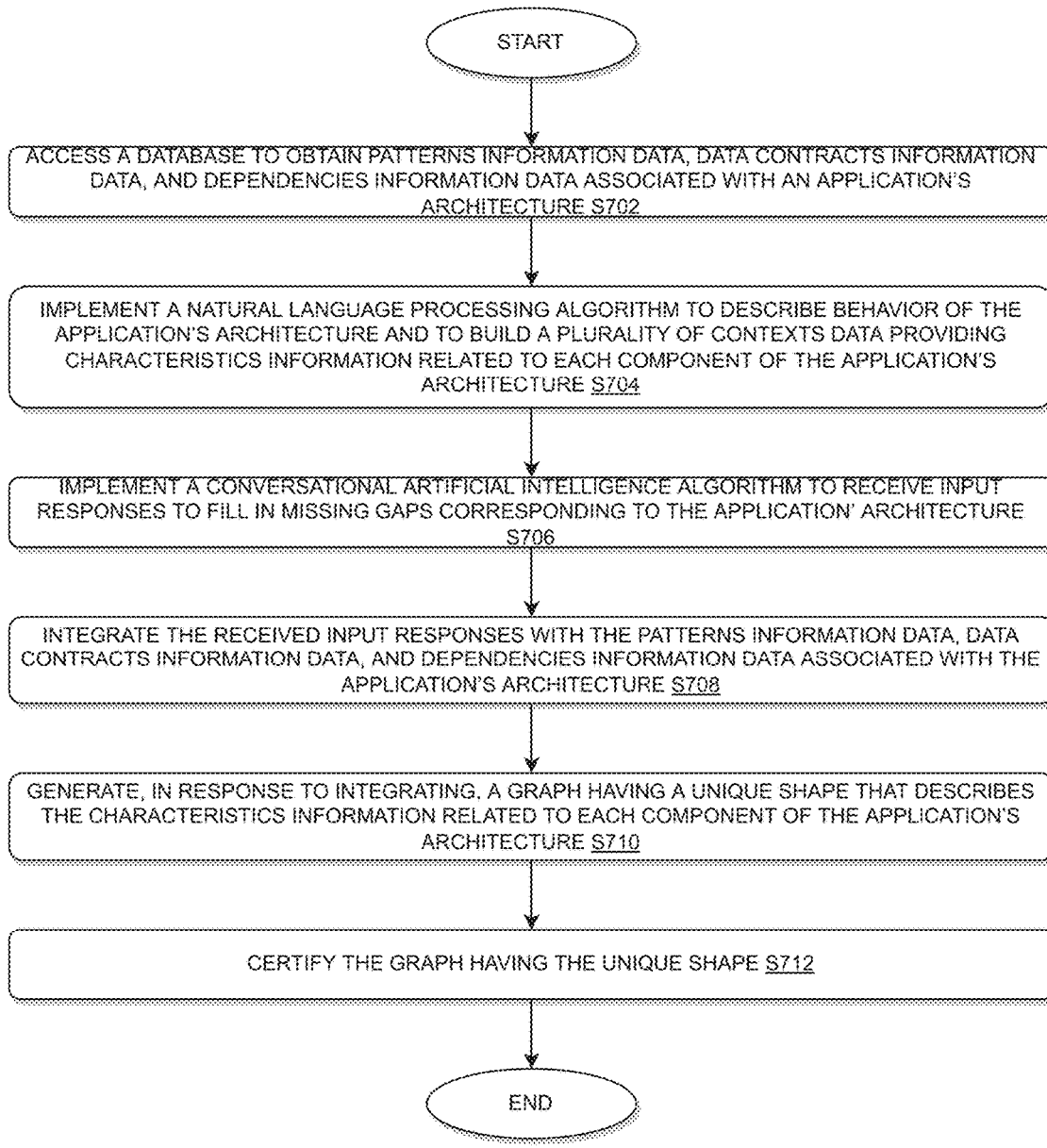
FIG. 7 illustrates a flow diagram for implementing a behavior driven architecture module in accordance with an exemplary embodiment.

FIG. 7 illustrates a flow diagram for implementing a behavior driven architecture module in accordance with an exemplary embodiment. It will be appreciated that the illustrated process 700 and associated steps may be performed in a different order, with illustrated steps omitted, with additional steps added, or with a combination of reordered, combined, omitted, or additional steps.

At step S702, the process 700 may access a database to obtain patterns information data, data contracts information data, and dependencies information data associated with an application's architecture.

At step S704, the process 700 may implement a natural language processing algorithm to describe behavior of the application's architecture and to build a plurality of contexts data providing characteristics information related to each component of the application's architecture.

At step S706, the process 700 may implement a conversational artificial intelligence algorithm to receive input responses to fill in missing gaps corresponding to the application' architecture.

At step S708, the process 700 may integrate the received input responses with the patterns information data, data contracts information data, and dependencies information data associated with the application's architecture.

At step S710, the process 700 may generate, in response to integrating, a graph having a unique shape that describes the characteristics information related to each component of the application's architecture.

At step S712, the process 700 may certify the graph having the unique shape.

According to exemplary embodiments, the process 700 may further include: implementing the graph in a process for identifying that a particular component having a certain characteristic meets a certain control or other compliance certification for deploying into an application development environment, or an application testing environment, or an application production environment.

According to exemplary embodiments, the process 700 may further include: generating the graph in manner such that the graph describes the behavior of how the application should work, identifies a location in the architecture where the architecture is subjected to a risk, and identifies a location in the architecture where mitigating controls or control requirements should exist in the architecture.

According to exemplary embodiments, the process 700 may further include: representing a particular component in the application's architecture based the unique shape of the graph and relationships between nodes in the graph.

According to exemplary embodiments, the process 700 may further include: automatically updating the graph and relationships between nodes in the graph in real time based on receiving real time additional data or change data corresponding to development of the application, and/or testing of the application, and/or production of the application that is output from a developer computing device.

According to exemplary embodiments, the process 700 may further include: accessing the database to obtain patterns information data, data contracts information data, and dependencies information data associated with a plurality of applications each having a unique shape that is different from a shape of another application among said plurality of applications; and implementing a natural language processing algorithm to describe behavior of a corresponding architecture associated with each application; implementing a conversational artificial intelligence algorithm to receive input responses to fill in missing gaps associated with the corresponding architecture; integrating the received input responses with the patterns information data, data contracts information data, and dependencies information data; and generating a graph for each application such that a graph for one application is unique in shape than a graph for another application among said plurality of applications.

According to exemplary embodiments, certification of the shape 604 may be important for use in a formal method or in a way to identify that particular shape 604 or element has a certain characteristics. Thus, utilizing the shape 604 or element having the characteristics, a user would be able to ascertain, given the context, exactly where the shape 604 or element is located at the application's architecture and/or whether it carries certain risk with it. Thus, if this shape is implemented into a particular network or a network zone, given the context, a user can determine that adding this element with another element in that location of the application's architecture may not work because of the characteristics of this element are not compatible with the characteristics of the other element or a user can determine that adding this element with another element in that location of the application's architecture may work because of the characteristics of this element are compatible with the characteristics of the other element.

As described herein, the BDAM 406, 506 takes the characteristics of that shape or element that is being described in simple natural language (i.e., in English), and uses a natural language processing algorithm to understand the application's architecture and builds its characteristics and assembles those into a smaller graph. The BDAM 406, 506 may evaluate the code and/or data structure itself, but the disclosure is not limited thereto.

The BDAM 406, 506 may also utilize natural language to describe the application's architecture and build a plurality of contexts to further provide more characteristics about that particular component or module of the architecture that has a meaning that carries with it additional context. Thus, a user may be able to ascertain what context that is or was. Thus, in modeling a control on this way, the control may look like a certain shape and has a certain characteristics and one would be able to essentially use that and establishes a link (see FIG. 6, bonding/bond=control, etc.) with that control such that the element now has the characteristic of that control in it. Therefore, the BDAM 406, 506 may use that and carry that into a pipeline of an application deployment so that a user can ascertain that since the control has that particular characteristics, it can be observed through all the way to deployment of the application into the environment and can automatically certify that this particular component meets a certain control (regulatory control, cybersecurity control, and general other polices within an organization) or other compliance certification.

According to exemplary embodiments, as described herein, the BDAM 406, 506 may implement few different steps, for example, describe the architecture, compiling into a graph, and taking the graph itself to break it down such that that particular graph has the characteristics of a unique shape that a user can certify. Thus, the graph can be utilized by BDAM 406 so that a user can say, in describing an architecture when building a component of the application's architecture, that what the architecture is, and/or what does it use, and/or on which it depends on, and/or what data contracts it has. Thus, a user can be assured that his/her codes for the application are giving the protection of a control the application needs because the graph is automatically generated from the architecture and certified.

According to exemplary embodiments, the compiled parts as illustrated in FIGS. 5 and 6, should be in the form of true or false types of responses, but the disclosure is not limited thereto. For example, is this control implemented?—Yes or no; does this application has this control?—Yes or no, etc.

Thus, there may be a lot of questions a user can ask about a particular application architecture just from the graph itself. Some of the benefits effected by the BDAM 406, 506 may include, but not limited thereto, the ability for a user to use additional interactions (i.e., conversational artificial intelligence), in order to ask questions about a particular application architecture. Alternatively, if a user is stitching together an entire enterprise of an application architecture, the user may be able to ask questions about the entire echo system, and be able to combine other higher level concepts that is given to the business such as domain modeling where a user lists the domains of business capabilities of an application and the user can start with higher level, i.e., a different perspective, to understand a landscape of an application. Thus, if a user may be able ask a basic question of which business capabilities are at risk of public or internet attacks, internet cybersecurity attacks, or internet originated cybersecurity attacks, and the user should be able to answer these questions from the auto-generated graph.

According to exemplary embodiments, the BDAD 402 may include a memory (e.g., a memory 106 as illustrated in FIG. 1) which may be a non-transitory computer readable medium that may be configured to store instructions for implementing the BDAM 406, 506 for automatically producing a behavioral graph as disclosed herein. The BDAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the BDAM 406 or within the BDAD 402, may be used to perform one or more of the methods and processes as described herein. In a particular embodiment, the instructions may reside completely, or at least partially, within the memory 106, the medium reader 112, and/or the processor 104 (see FIG. 1) during execution by the BDAD 402.

For example, the instructions, when executed, may cause the processor 104 to perform the following: accessing a database to obtain patterns information data, data contracts information data, and dependencies information data associated with an application's architecture; implementing a natural language processing algorithm to describe behavior of the application's architecture and to build a plurality of contexts data providing characteristics information related to each component of the application's architecture; implementing a conversational artificial intelligence algorithm to receive input responses to fill in missing gaps corresponding to the application' architecture; integrating the received input responses with the patterns information data, data contracts information data, and dependencies information data associated with the application's architecture; and generating, in response to integrating, a graph having a unique shape that describes the characteristics information related to each component of the application's architecture, but the disclosure is not limited thereto.

According to exemplary embodiments, the instructions, when executed, may cause the processor 104 to perform the following: implementing the graph in a process for identifying that a particular component having a certain characteristic meets a certain control or other compliance certification for deploying into an application development environment, or an application testing environment, or an application production environment.

According to exemplary embodiments, the instructions, when executed, may cause the processor 104 to perform the following: generating the graph in manner such that the graph describes the behavior of how the application should work, identifies a location in the architecture where the architecture is subjected to a risk, and identifies a location in the architecture where mitigating controls or control requirements should exist in the architecture.

According to exemplary embodiments, the instructions, when executed, may cause the processor 104 to perform the following: representing a particular component in the application's architecture based the unique shape of the graph and relationships between nodes in the graph.

According to exemplary embodiments, the instructions, when executed, may cause the processor 104 to perform the following: automatically updating the graph and relationships between nodes in the graph in real time based on receiving real time additional data or change data corresponding to development of the application, and/or testing of the application, and/or production of the application that is output from a developer computing device.

According to exemplary embodiments, the instructions, when executed, may cause the processor 104 to perform the following: accessing the database to obtain patterns information data, data contracts information data, and dependencies information data associated with a plurality of applications each having a unique shape that is different from a shape of another application among said plurality of applications; and implementing a natural language processing algorithm to describe behavior of a corresponding architecture associated with each application; implementing a conversational artificial intelligence algorithm to receive input responses to fill in missing gaps associated with the corresponding architecture; integrating the received input responses with the patterns information data, data contracts information data, and dependencies information data; and generating a graph for each application such that a graph for one application is unique in shape than a graph for another application among said plurality of applications.

According to exemplary embodiments as disclosed above in FIGS. 1-7, technical improvements effected by the instant disclosure may include platforms for implementing a behavior driven architecture module for automatically producing consistent designs and ensuring that the assessment and documentation of a system's architecture is current, but the disclosure is not limited thereto. For example, according to exemplary embodiments as disclosed above in FIGS. 1-7, technical improvements effected by the instant disclosure may include platforms for implementing a behavior driven architecture module that automatically produces and consumes architectural and design information of a system in a consistent manner, describes the behavior of how the system should work, identifies where the inherent risks (e.g., cybersecurity risks, operational risks, etc., but the disclosure is not limited thereto) are in the architecture, and identifies where the mitigating controls or control requirements should exist in the architecture, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a behavior driven architecture module by utilizing one or more processors and one or more memories, the method comprising:
accessing a database to obtain patterns information data, data contracts information data, and dependencies information data associated with an application's architecture;
implementing a natural language processing algorithm to describe behavior of the application's architecture and to build a plurality of contexts data providing characteristics information related to each component of the application's architecture;
implementing a conversational artificial intelligence algorithm to receive input responses to fill in missing gaps corresponding to the application's architecture;
integrating the received input responses with the patterns information data, data contracts information data, and dependencies information data associated with the application's architecture; and
generating, in response to integrating, a graph having a unique shape that describes the characteristics information related to each component of the application's architecture and that describes the behavior of how the application should work, identifies a location in the application's architecture where the application's architecture is subjected to a risk, and identifies a location in the application's architecture where mitigating controls or control requirements should exist in the application's architecture.

2. The method according to claim 1, further comprising:
certifying the graph having the unique shape; and
implementing the graph in a process for identifying that a particular component having a certain characteristic meets a certain control or other compliance certification for deploying into an application development environment, or an application testing environment, or an application production environment.

3. The method according to claim 2, wherein the control includes one or more of the following: regulatory control, cybersecurity control, and general policy within an organization.

4. The method according to claim 1, wherein the risk includes one or more of the following: cybersecurity risk, operational risk, public or internet attack risk, and internet originated cybersecurity attack risk.

5. The method according to claim 1, further comprising:
representing a particular component in the application's architecture based the unique shape of the graph and relationships between nodes in the graph.

6. The method according to claim 1, further comprising:
automatically updating the graph and relationships between nodes in the graph in real time based on one or more of the following: receiving real time additional data, change data corresponding to development of the application, testing of the application, and production of the application that is output from a developer computing device.

7. The method according to claim 1, further comprising:
accessing the database to obtain patterns information data, data contracts information data, and dependencies information data associated with a plurality of applications each having a unique shape that is different from a shape of another application among said plurality of applications; and
implementing a natural language processing algorithm to describe behavior of a corresponding architecture associated with each application;
implementing a conversational artificial intelligence algorithm to receive input responses to fill in missing gaps associated with the corresponding architecture;
integrating the received input responses with the patterns information data, data contracts information data, and dependencies information data; and
generating a graph for each application such that a graph for one application is unique in shape than a graph for another application among said plurality of applications.

8. A system for implementing a behavior driven architecture module, the system comprising:
a processor; and
a memory operatively connected to the processor via a communication interface, the memory storing computer readable instructions, when executed, causes the processor to:
access a database to obtain patterns information data, data contracts information data, and dependencies information data associated with an application's architecture;
implement a natural language processing algorithm to describe behavior of the application's architecture and to build a plurality of contexts data providing characteristics information related to each component of the application's architecture;
implement a conversational artificial intelligence algorithm to receive input responses to fill in missing gaps corresponding to the application's architecture;
integrate the received input responses with the patterns information data, data contracts information data, and dependencies information data associated with the application's architecture; and
generate, in response to integrating, a graph having a unique shape that describes the characteristics information related to each component of the application's architecture and that describes the behavior of how the application should work, identifies a location in the application's architecture where the application's architecture is subjected to a risk, and identifies a location in the application's architecture where mitigating controls or control requirements should exist in the application's architecture.

9. The system according to claim 8, wherein the processor is further configured to:
certify the graph having the unique shape; and
implement the graph in a process for identifying that a particular component having a certain characteristic meets a certain control or other compliance certification for deploying into an application development environment, or an application testing environment, or an application production environment.

10. The system according to claim 9, wherein the control includes one or more of the following: regulatory control, cybersecurity control, and general policy within an organization.

11. The system according to claim 8, wherein the risk includes one or more of the following: cybersecurity risk, operational risk, public or internet attack risk, and internet originated cybersecurity attack risk.

12. The system according to claim 8, wherein the processor is further configured to:

represent a particular component in the application's architecture based the unique shape of the graph and relationships between nodes in the graph.

13. The system according to claim 8, wherein the processor is further configured to:
   automatically update the graph and relationships between nodes in the graph in real time based on one or more of the following: receiving real time additional data, change data corresponding to development of the application, testing of the application, and/or production of the application that is output from a developer computing device.

14. The system according to claim 8, wherein the processor is further configured to:
   access the database to obtain patterns information data, data contracts information data, and dependencies information data associated with a plurality of applications each having a unique shape that is different from a shape of another application among said plurality of applications; and
   implement a natural language processing algorithm to describe behavior of a corresponding architecture associated with each application;
   implement a conversational artificial intelligence algorithm to receive input responses to fill in missing gaps associated with the corresponding architecture;
   integrate the received input responses with the patterns information data, data contracts information data, and dependencies information data; and
   generate a graph for each application such that a graph for one application is unique in shape than a graph for another application among said plurality of applications.

15. A non-transitory computer readable medium configured to store instructions for implementing a behavior driven architecture module, wherein, when executed, the instructions cause a processor to perform the following:
   accessing a database to obtain patterns information data, data contracts information data, and dependencies information data associated with an application's architecture;
   implementing a natural language processing algorithm to describe behavior of the application's architecture and to build a plurality of contexts data providing characteristics information related to each component of the application's architecture;
   implementing a conversational artificial intelligence algorithm to receive input responses to fill in missing gaps corresponding to the application's architecture;
   integrating the received input responses with the patterns information data, data contracts information data, and dependencies information data associated with the application's architecture; and
   generating, in response to integrating, a graph having a unique shape that describes the characteristics information related to each component of the application's architecture and that describes the behavior of how the application should work, identifies a location in the application's architecture where the application's architecture is subjected to a risk, and identifies a location in the application's architecture where mitigating controls or control requirements should exist in the application's architecture.

16. The non-transitory computer readable medium according to claim 15, wherein the instructions, when executed, cause the processor to further perform the following:
   certifying the graph having the unique shape; and
   implementing the graph in a process for identifying that a particular component having a certain characteristic meets a certain control or other compliance certification for deploying into an application development environment, or an application testing environment, or an application production environment.

17. The non-transitory computer readable medium according to claim 16, wherein the control includes one or more of the following: regulatory control, cybersecurity control, and general policy within an organization.

* * * * *